United States Patent

Fox

[15] 3,662,347

[45] May 9, 1972

[54] SIGNAL COMPRESSION AND EXPANSION SYSTEM USING A MEMORY

[72] Inventor: Duane C. Fox, Fullerton, Calif.

[73] Assignee: North American Rockwell Corporation, El Segundo, Calif.

[22] Filed: Mar. 11, 1970

[21] Appl. No.: 18,584

[52] U.S. Cl. ..........................340/172.5, 333/14, 179/15 AV

[51] Int. Cl. ...................G05b 11/26, G05f 5/00, H03k 13/17

[58] Field of Search .................340/172.5; 343/5; 235/150.5; 325/41, 42, 43; 179/15 AV; 333/14

[56] References Cited

UNITED STATES PATENTS

| | | | |
|---|---|---|---|
| 3,146,343 | 8/1964 | Young | 235/150.5 |
| 3,150,374 | 9/1964 | Sunstein et al. | 343/204 |
| 3,180,939 | 4/1965 | Hall | 179/15 |
| 3,235,844 | 2/1966 | White | 340/172.5 |
| 3,244,808 | 4/1966 | Roberts | 178/6 |
| 3,327,063 | 6/1967 | Remley | 179/15.55 |
| 3,330,943 | 7/1967 | Hawkins | 235/150.5 |
| 3,344,406 | 9/1967 | Vinal | 340/172.5 |
| 3,346,844 | 10/1967 | Scott et al. | 340/146.2 |
| 3,361,897 | 1/1968 | Rush | 235/150.21 |
| 3,430,206 | 2/1969 | Ernyei et al. | 340/172.5 |
| 3,435,148 | 3/1969 | Yoshine | 179/15 |
| 3,452,297 | 6/1969 | Kelly et al. | 332/9 |
| 3,506,811 | 4/1970 | Yetter | 235/150.1 |
| 3,508,152 | 4/1970 | Sivertson, Jr. | 325/42 |
| 3,534,264 | 10/1970 | Blasbalg et al. | 325/15 |
| 3,016,528 | 1/1962 | Villars | 179/15 |
| 3,366,949 | 1/1968 | Bruce | 179/15 |
| 3,381,277 | 4/1968 | Stansby | 340/172.5 |
| 3,500,441 | 3/1970 | Brolin | 179/15 |
| 3,550,114 | 12/1970 | Cole | 235/150 X |
| 3,414,818 | 12/1968 | Reidel | 333/14 X |
| 3,573,591 | 4/1971 | Chatelon et al. | 333/14 X |

*Primary Examiner*—Paul J. Henon
*Assistant Examiner*—Jan E. Rhoads
*Attorney*—L. Lee Humphries, H. Fredrick Hamann and Robert G. Rogers

[57] ABSTRACT

The compander system uses a register having a limited number of possible digital states, or counts, each weighted to represent a certain voltage. Each count is used to address a location in a memory which stores digital numbers having a different number of bit positions relative to the bit positions of the count in the register. Each number is weighted to represent a different voltage from the voltage value represented by the register count. An analog signal is generated in response to the stored digital number for comparison with the input signal even though the register count is changed as if the voltage represented by its count had been used for making the comparison. The process is continued until the signals are within the limits provided by the least significant digit of the stored number. The number in the register is then transmitted to the receiver where the digital signal is converted into an analog signal using an additional memory and register having a limited number of bit positions.

10 Claims, 5 Drawing Figures

INVENTOR.
DUANE C. FOX

BY Robert G. Rogers

ATTORNEY

DUANE C. FOX INVENTOR.

BY Robert G. Rogers

ATTORNEY

TABLE I

| OUTPUT REG. | | | | READ ONLY MEMORY | | | | | |
|---|---|---|---|---|---|---|---|---|---|
| 3 | 2 | 1 | COUNT | 5 | 4 | 3 | 2 | 1 | COUNT |
| 0 | 0 | 0 | 0 | 0 | 0 | 0 | 0 | 0 | 0 |
| 0 | 0 | 1 | 1 | 0 | 1 | 0 | 1 | 0 | 10 |
| 0 | 1 | 0 | 2 | 1 | 0 | 0 | 1 | 0 | 18 |
| 0 | 1 | 1 | 3 | 1 | 0 | 1 | 1 | 1 | 23 |
| 1 | 0 | 0 | 4 | 1 | 1 | 0 | 0 | 1 | 25 |
| 1 | 0 | 1 | 5 | 1 | 1 | 0 | 1 | 1 | 27 |
| 1 | 1 | 0 | 6 | 1 | 1 | 1 | 0 | 1 | 29 |
| 1 | 1 | 1 | 7 | 1 | 1 | 1 | 1 | 1 | 31 |

INVENTOR
DUANE C. FOX

BY Robert G. Rogers
ATTORNEY

INVENTOR.
DUANE C. FOX
BY
Robert G. Rogers
ATTORNEY

SIGNAL COMPRESSION AND EXPANSION SYSTEM USING A MEMORY

BACKGROUND OF THE INVENTION

1. Field of the Invention

The invention comprises a digital system for compressing and expanding a signal and, more particularly, to such a system in which a memory is used to store digital numbers having an increased resolution for more accurately compressing and expanding the signal.

2. Description of Prior Art

Companding systems are described generally on pgs. 181 through 184 in the book entitled, *Telecommunications and the Computer*, by James Martin, Prentice-Hall Series in Automatic Computation, copyright 1969 by Prentice-Hall, Inc., Englewood Cliffs, N.J. As indicated in the book, one problem in transmitting signals is that the system must be designed to accommodate signals that vary widely in strength. The system should be able to reduce the amplitude of the loud signals and increase the amplitude of the low signals at the transmitter end. The system should also be able to reverse the process at the receiving end. Such a system is called a compander.

A compander reduces the highs and increases the lows so that the high signals do not overload the amplifiers of the system. The low signals are increased so that the signals are higher than the anticipated noise level between the transmitter and receiver.

However, a compander is desired which can more accurately resolve the higher and lower signal values. In one standard system, the signals compared at each sample interval are resolved to seven places of accuracy. Obviously, the accuracy can be improved by increasing the resolution. However, as a practical matter, the logic and register size required to increase the resolution beyond a limited number of positions causes high data transmission rates and is, therefore, undesirable. A need exists for a compander system which can increase the accuracy and resolution of each signal sampled without the necessity for relatively large and complex systems that add to the operating expense, high data bandwidth and contribute to transmission delays. The invention described herein provides such a system.

SUMMARY OF THE INVENTION

Briefly, the invention comprises a digital system in which a signal is compressed at the receiver end and expanded at the transmitter end with increased resolution without increasing the transmission time. An added memory, such as a read-only memory or programmable memory, stores a number which controls the reference voltage generated for comparison with an input voltage. The memory is addressed by a register which is incremented by the output from a comparator.

In one embodiment, the system is used as a voice compander. In another embodiment, the system can be used to compress high dynamic range data generated by satellite instrumentation.

The preferred system embodiment includes a comparator for comparing the analog input signal with a compare signal which is systematically changed until the two signals are approximately equal. The output of the comparator provides an input to a register having a limited number of bit positions each weighted to represent a certain voltage value. Each input changes the count in the register.

The output from the register is used to address storage locations in a read-only memory. Each storage location contains a number having an increased number of bits each weighted to represent a voltage value which is different from the voltage value represented by the number in the register. The output from the read-only memory is converted into a signal for comparison with the input signal. However, the register number is changed as though the voltage represented by the register number was used in the comparison.

The process is continued until the two inputs to the comparator are approximately equal. The number in the register is then transmitted to the receiver where it is reconverted into an analog signal by using another read-only memory which is addressed by each number in the register.

In the preferred embodiment, the read-only memory number results in higher voltages being used in the comparator. However, in other embodiments, different types of companding curves can be generated by changing the relative relationship of the stored numbers.

Since the read-only memory stores digital numbers having an increased number of bit positions, the resolution of the system is increased without increasing the transmission time. For example, if the register has seven bit positions, the input signal can only be resolved to seven bits of accuracy. However, by using a read-only memory for storing numbers having, for example, 11 bit positions, the signal can be resolved to eleven bits of accuracy during each sampling interval.

In addition, a plurality of comparators and shift registers can be used with a single read-only memory in a multiplexing system.

Therefore, it is an object of this invention to provide an improved system for compressing and expanding a signal using a read-only memory to obtain a high resolution of the signal during the compression and the expansion without increasing the transmission time.

It is another object of this invention to provide a relatively higher resolution system for companding a signal using digital numbers having one weighted value relative to the signal for addressing stored digital numbers in a read-only memory having another weighted value of higher resolution.

A further object of the invention is to provide a voice transmission system for generating higher resolution digital numbers for the relatively lower amplitudes of an analog voice signal.

A still further object of the invention is to provide a high resolution system for relatively low amplitude signals in which (during each sampling time) an input signal is compared with a signal generated by converting the input signal into a digital number which is used to address a read-only memory storing digital numbers with improved resolution. The stored numbers with higher resolution control the generation of the compared signal.

A still further object of this invention is to provide an improved system for compressing and expanding a voice signal by using a read-only memory in a multiplexing arrangement.

A still further object of this invention is to provide an improved companding system for use in a communications system.

These and other objects of the invention will become more apparent when taken in connection with the drawings, a brief description of which follows:

DESCRIPTION OF PREFERRED EMBODIMENT

Figure 1A:
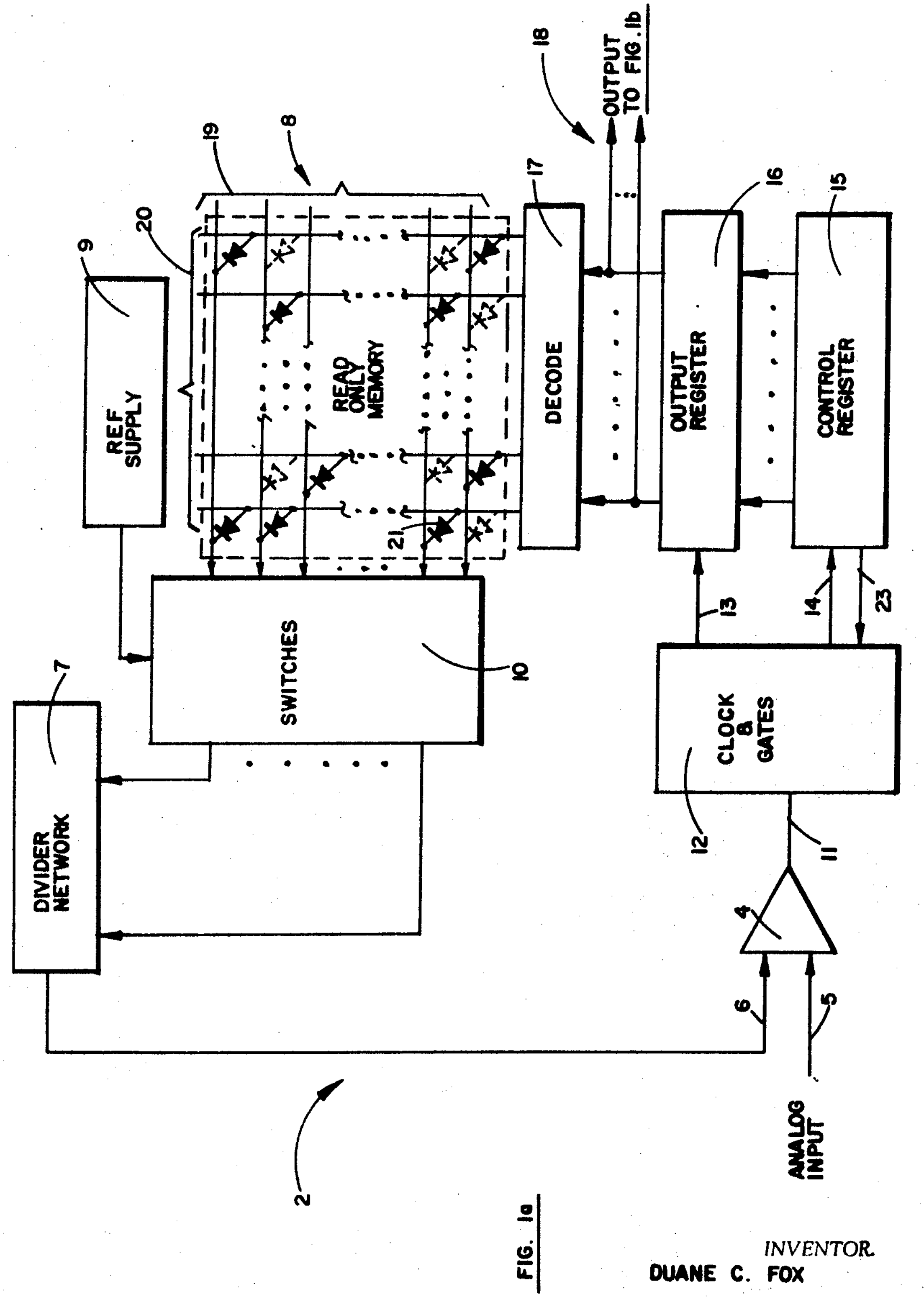
FIG. 1*a* and 1*b* are partial schematic, block diagrams of one embodiment of the system showing the transmitter and the receiver.
Figure 1B:
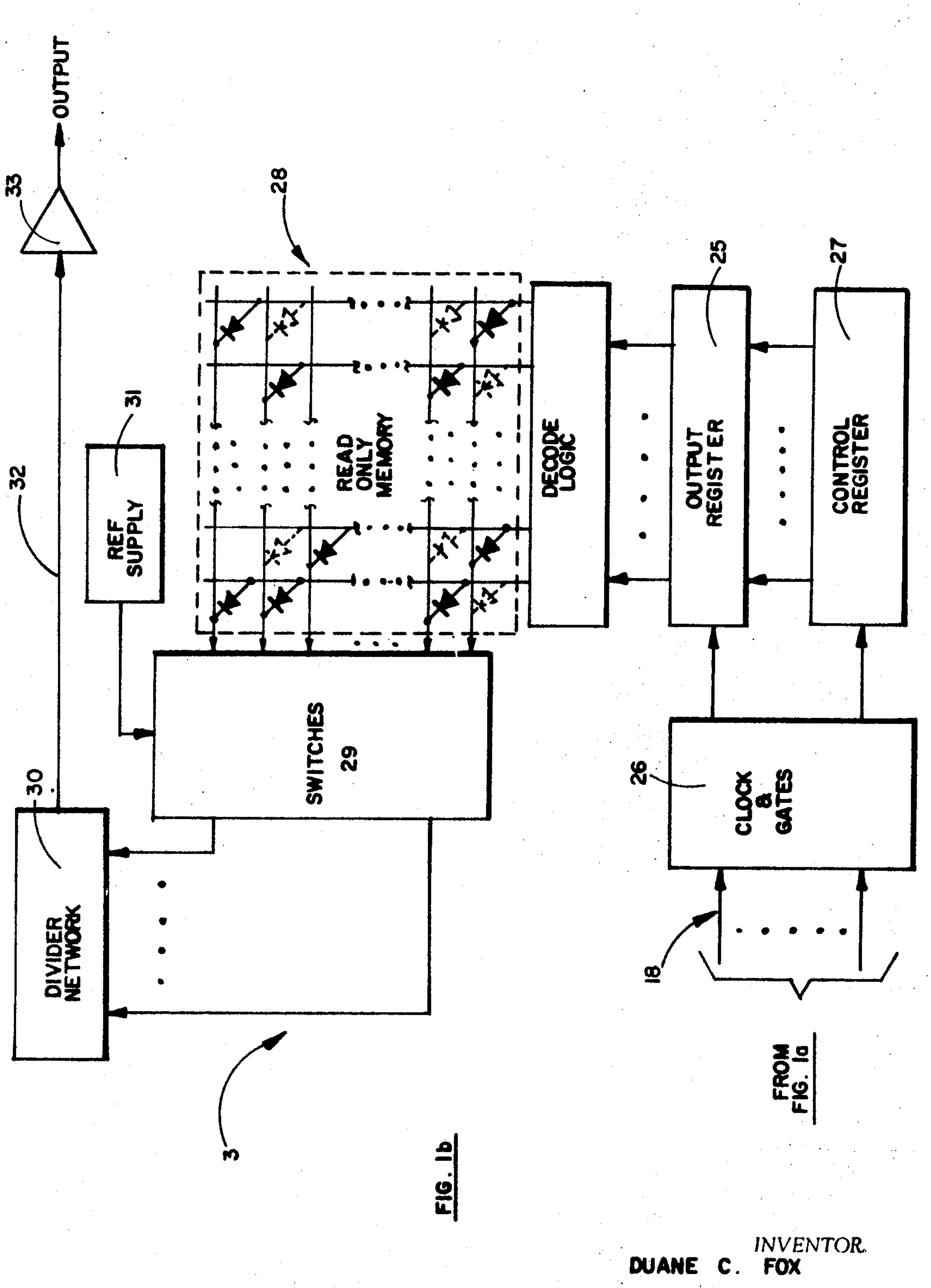

FIGS. 1*a* and 1*b* are a partial schematic, partial block diagram of a compander system comprising modified successive approximation converter circuit 2 at the transmitter end of the system and digital-to-analog converter circuit 3 at the receiver end of the system. The system is illustrated generally since successive approximation circuits as well as the digital-to-analog converter circuits incorporated therein are believed well known to persons skilled in the art. Examples of such systems can be found on pg. 289 of the *Digital Logic Handbook*, copyright 1966 by Digital Equipment Corporation.

The book also contains reference to other circuits for forming analog-to-digital conversion and digital-to-analog conversion in addition to the successive approximation converter. A specific logic diagram of a successive approximation converter is shown on pgs. 292 and 293 of the handbook. A block diagram of a successive approximation converter is shown on pg. 291 of the handbook.

As indicated above, the FIG. 1 system illustrates a modified successive approximation converter in which a read-only memory and a modified D-A divider network have been added. The D-A divider network was modified to accommodate changes in the system due to the addition of the read-only memory.

It is pointed out that while a successive approximation converter circuit is shown as the preferred embodiment, other circuits are within the scope of the invention. For example, a simultaneous analog-to-digital converter could be modified according to the principles described herein. A counter converter circuit can also be modified by the incorporation of a read-only memory as described herein. The counter method is good for high resolution systems whereas the continuous conversion method is particularly useful when a single channel of information is to be converted. For higher speed conversions of many channels, the successive approximation converter is preferred.

The successive approximation converter circuit 2 includes a comparator circuit 4 which receives an analog input signal on line 5 and a reference signal on line 6 from divider network 7. Comparator circuits, which are commercially available, provide an output signal as a function of the difference between the signals being compared. For example, if the reference signal is higher than the analog input signal, a negative output pulse may be generated. On the other hand, if the reference signal is less than the input signal, a positive output pulse may be generated. The exact output response of the comparator may vary in the function of the particular circuit selected for the converter. Comparator circuits may be implemented by semiconductor difference amplifiers.

Divider networks are also well known to persons skilled in the art. In a practical embodiment, a divider network may be implemented by a plurality of parallel connected resistors each progressively weighted as in a binary manner. Different combinations of resistors are used to provide difference reference signals on line 6 as a function of the output from the read-only memory 8.

The voltage provided from the supply source 9 is divided through the divider network under the control of read-only memory 8 to provide the reference signal to comparator 4 on line 6. Switches 10, such as level amplifiers, control the switching of the resistors in response to the output of read-only memory 8.

The output from the comparator 4 on line 11 provides an input to the successive approximation gating logic included within block 12 with the clock generator (not shown). The successive approximation logic may be implemented by a plurality of AND gates gated by clock pulses from the clock generator. In one embodiment, the clock generates a train of pulses having a period, or frequency, which allows for logic delays and switching time of the system.

The clock and successive approximation logic 12 provide inputs on lines 13 and 14 to control register 15 and the output register 16 of converter 2. The control register may be implemented by a series of flips flops connected as a simple shift register.

In one embodiment, a single logic one is set in the most significant bit of the control register initially. The logic one shifts one bit to the right upon the receipt of each clock pulse. The location of the logic one in the control register indicates the logic setting of the next bit position of the output register. The location of the logic one also indicates which bit position of the output register to extinguish, or reset to zero, if the output pulse from the comparator indicates that the reference voltage signal is too high.

An output signal is provided from the control register to the clock on line 23 for indicating the end of the conversion when the logic one has been shifted into the last bit position of the control register 15. The clock is then turned off until the next conversion sequence.

Output register 16 may be implemented by a plurality of flip flops each providing an output to decode logic 17. The binary number in the output register 16 is increased or decreased under the control of the clock signal as a function of the output from comparator 4. In prior converter systems, the output from register 16 is ordinarily used to control the resistor combinations of divider network 7.

The number in the register would ordinarily have been increased until the output from the comparator indicated that the signals on lines 5 and 6 were approximately equal. At that time, a plurality of digital pulses representing the number in the register 16 would have been provided as an output on lines designated generally by numeral 18. However, in the present converter circuit, the register 16 binary number is decoded by decode logic 17 and used to address locations in read-only memory 8. The decode logic may be implemented by AND gates as is well known to persons skilled in the art.

The read-only memory comprises a matrix of conductors 19 in the X direction and conductors 20 in the Y direction. Although various semiconductors may be used to implement the read-only memory, diodes are shown in the FIG. 1 embodiment. In other embodiments, field effect transistors and other devices can be used as a read-only memory. Diodes are connected between the X and Y conductors to indicate a logic one at a particular bit position. The absence of a diode indicates that a logic zero has been stored at that bit position. The missing diodes are represented by the dotted diode symbols.

If the output representing a particular bit position from the decode logic 17 is positive and the Y lines are open, a diode such as diode 21 becomes conductive to clamp the X line to the positive voltage. Other conventions, however, may also be used. For example, a negative voltage level, −V, could be provided on the Y lines so that when the output from the decode logic network 17 on an X line is electrical ground, the diodes could become conductive to clamp the Y line to apply electrical ground. In addition, the diodes could be reversed to permit negative output signals from logic 17.

Read-only memory 8 stores binary numbers each weighted according to a certain predetermined voltage output from divider network 7. Each stored binary number is addressed by a number in the output register 16. Therefore, by storing numbers in the read-only memory which are greater in value than the corresponding number in the output register, it is possible to generate a companding curve which has any desired configuration.

Figures 2A, 2B:
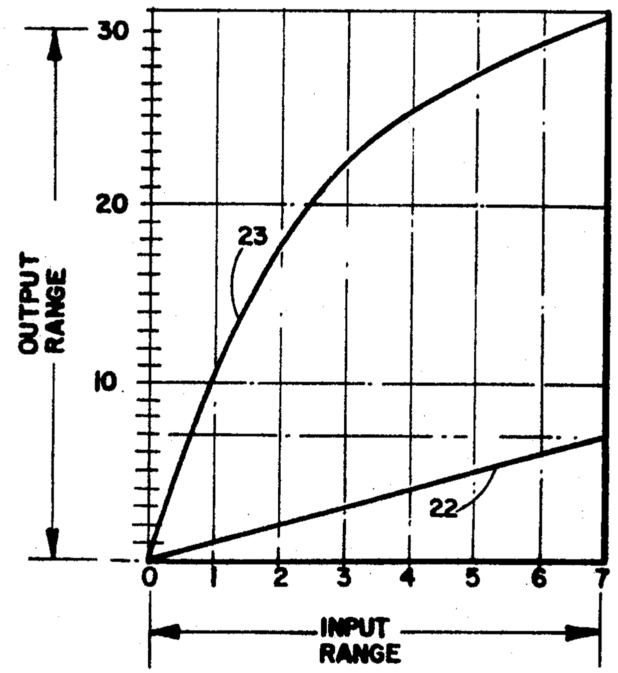
FIG. 2*a* is an example of one type of compander curve to which signals processed by the FIG. 1 system conform.
FIG. 2*b* is a table showing the relationship between the counter in the output register with the stored numbers in the read-only memory.

In the usual case, the companding curve is linear, as shown by the linear line 22 in FIG. 2*a*. As the input voltage increases, the digital number in the output register also increases in a linear fashion. The slope of the companding line can be changed as a function of the length of the output register. However, regardless of the length of the register, the slope remains linear.

It is desirable in some cases to amplify the low input signals for overcoming noise problems and to compress the relatively high signals so that limits of the operational devices used by the system are not exceeded. An example of a companding curve which can be generated by one embodiment of the converter system is represented by the curved line 23 in FIG. 2. It is also possible to compare the prior art linear curve with the nonlinear companding curve provided by read-only memory 8 and the modified divider network 7.

It should be obvious that for relatively low inputs a relatively higher output is provided. For example, for an input represented by the number 1 on the abscissa, the output is represented by the number 10 on the ordinate. By way of comparison, using a linear system, the input represented by the number one on the abscissa is represented by the number one on the ordinate.

The exact type of companding curve is selected as a function of the particular system being used. If voice signals are being used, the relatively low input values are increased for overcoming noise on the transmission line. For that case, relatively higher numbers are stored in the bit positions of the read-only memory to correspond with the relatively low numbers in the output register. Similarly, relatively lower digital numbers are stored in the read-only memory for the relatively higher numbers in the output register. In other words, the resolution of the lower signals is increased as a function of the number stored in the read-only memory.

It is pointed out that the output register could be comprised of X bit positions and the read-only memory 8 could be used to store $2^X$ words each having Y bits. The divider network and the other functioning elements of the system must be modified depending upon the particular values of X and Y. For purposes of describing a specific example, assume that X equals 3 and that Y equals 5. Table I, shown in FIG. 2*b*, illustrates the relationship between the number in the output register and the numbers in the read-only memory.

For example, for a count of 1, a location in the read-only memory storing a 10 is addressed. For a count of 3 in the output register, a location in the memory storing the number 23 is addressed. Finally, for the maximum count of 7, the read-only memory stores a number 31.

If desired, the number stored in the memory may be varied. For example, at count 5 instead of 27, a number 1 or 45 could be stored. Similar changes may be made to generate any desired curve.

In the standard system, an input register having seven bits is used. In that case, the register may have any one of sixty-four combinations of numbers. By using a read-only memory storing, for example, ten bit numbers, the 64 possible combinations can be expanded to 2,048 possible combinations. Therefore, the resolution of each combination of numbers in the register is greatly increased.

At the receiver end of the system, FIG. 1*b*, the transmitted digital signal comprising a plurality of pulses is processed by logic under the control of a clock and gated into the proper position of the output register 25. In other words, if a plurality of pulses representing a number 1001110 are transmitted, the bit positions corresponding to those pulses could be set accordingly. Block 26 represents the gating logic and clock.

The output register is controlled by control register 27 which is incremented or decremented in response to outputs from block 26 as a function of the inputs on lines 18.

The register 25 contents are decoded to address corresponding locations in the read-only memory 28. The stored numbers appear at the output for controlling switches 29. The switches 29 switch the corresponding resistance divider network 30 between the reference supply 31 and the input line 32 into the amplifier 33. The amplifier provides an analog signal at its output which represents the digital number addressed in the read-only memory by the register.

Figure 3:
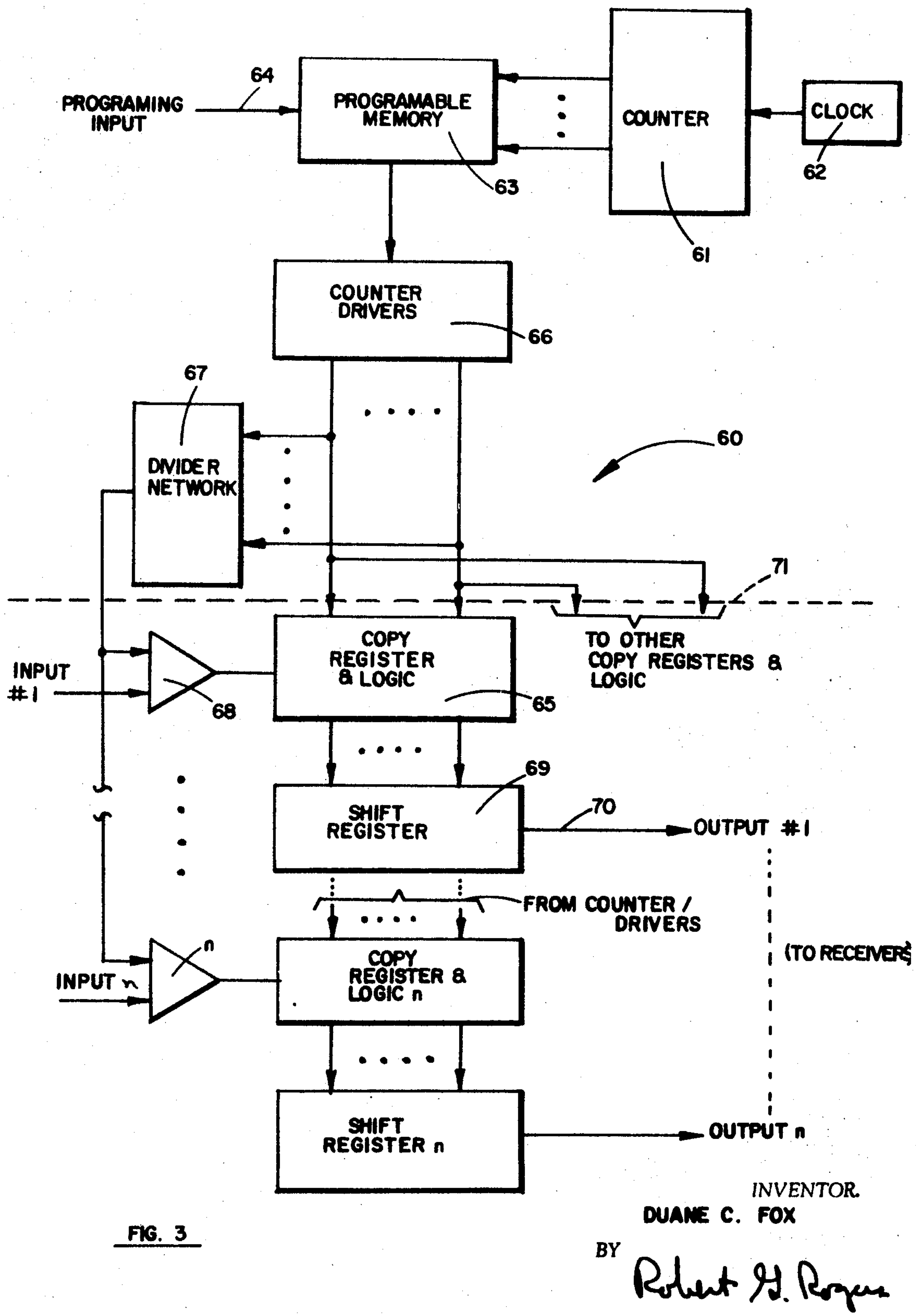
FIG. 3 is a block diagram of a different embodiment of a compander system showing a multiplex arrangement of the comparators and registers.

FIG. 3 is a second embodiment of a companding system implemented as a chronometric encoder system 60 and showing a multiplex arrangement. The system includes counter 61 responsive to clock pulses from clock 62. The counter output is used to address locations in programmable memory 63. It is pointed out that a read-only memory could also be used. However, for certain applications it is desired to be able to change the contents of the memory. In those cases, a programmable memory is required. A programming input is shown on line 64.

As one example of the system assume that a copy register, shown as part of block 65, has six bit positions. In that case, the copy register has 64 possible states. An equal number of logic ones are stored in the memory, i.e. 64 logic ones are stored in the memory. When a location in the memory in which a logic one has been stored is addressed by counter 61, an output is provided to the counter/driver circuits 66.

The counter/driver circuit 66 provides an output to the resistance divider network and to the copy register 65. Block 65 includes appropriate logic for setting the correct number in the copy register.

The divider network 67 provides an output voltage to comparator 68 as a function of the output from the counter/driver circuit 66. For the particular embodiment shown, the network provides simultaneous outputs to a plurality of comparators from 68 to *n*. The comparators receive independent inputs, 1 through *n*, and provide outputs as a function of the difference between the reference signal input and the other inputs. If the signals are different, the comparators provide an output to their associated copy registers.

The copy registers 65 through n are increased by the output of the counter/driver circuit 66 until the signals to each associated comparator are approximately equal. At that time, the copy register discontinues responding to the counter/driver circuit 66. Since each comparator is independent of the other, equality may be reached at different times. The counter 61 counts through all locations in memory 63 so that equality at each comparator is reached before beginning a new cycle.

The shift registers continue to increase in response to the copy registers. When the copy registers and the counter, block 66, are equal, the comparator outputs become zero and the shift register contents are transferred via line 70, etc. to the receiver (not shown). It should be understood that the transmitter circuitry could be duplicated for the receiver in a manner similar to that shown in FIG. 1. It is pointed out that all the copy registers are controlled by a single counter, 66. As a result, substantial duplication of equipment can be avoided. The common equipment of the system is shown above line 71.

I claim:

1. A signal companding system providing a change in data compression simultaneously with data conversion comprising:

means for comparing an input analog signal and a variable analog reference signal until said input signal and said reference signal are approximately equal and providing a digital comparator output signal indicative of the difference between said input analog signal and said variable analog reference signal, clock generator and successive approximation logic means responsive to said digital comparator output signal, control register means responsive to a digital signal from said clock generator and successive approximation logic means for temporarily storing binary numbers indicative of the value of said input signal relative to said reference signal, said control register providing an update signal to said clock and logic means indicative of the logic state of said control register, output register means responsive to a digital signal from said clock and logic means for registering the binary logic state of said control register, decode logic means for decoding the binary number contained in said output register, memory means addressed by the output of said decode logic means with stored preselected numbers each having a length in excess of the length of said register means, the bit positions of said numbers being weighted to represent a certain voltage level, said memory means providing an output as a function of the number in said output register means, said memory output signal changing in value each time the contents of said output register means changes, voltage divider means comprising a reference voltage supply and switching means responsive to said memory output for providing said analog reference signal, transmitting means responsive to said clock and logic means for transmitting the digital output of said output register at preselected equal time intervals, and receiver means responsive to said digital output transmitted by said transmitting means for regenerating the first recited analog input signal.

2. The system recited in claim 1 wherein said system receiver means further comprises:

second logic means for processing the output of said output register, third register means responsive to said second logic means for receiving said processed output of said output register, second decode logic means for decoding the output of said third register means, and second memory means responsive to the decoded numbers in said third register means for regenerating the first recited input signal.

3. The system recited in claim 1 wherein said decode logic means includes means for addressing locations in said memory means, each decoded number from said output register representing an address location in said first memory, means responsive to the output from said first memory means for generating said reference signal according to the weighted voltage represented by the numbers at said addressed location, whereby although the output register is increased by said comparator means until said input signal and said reference signal are approximately equal, said reference signal is provided by said stored numbers in said first memory.

4. The system recited in claim 1 wherein said first memory means is a read-only memory, said input signal is an analog signal and said transmitted output of said output register is a digital signal representing the value of said input signal.

5. The system recited in claim 1 wherein said first memory means is a programmable memory.

6. The system recited in claim 1 further including counter means counted by clock pulses, and said first memory being addressed by the count in said counter means, said first memory storing preselected numbers for each number in said output register means, said stored numbers being relatively longer than the numbers in said output register means for increasing the comparison resolution of said system, said first memory means being responsive to the count in said counter means for providing an output each time the count equals one of the possible numbers in said output register means, said output from said first memory means controlling the generation of said variable reference signal.

7. The system recited in claim 6 further including second counter means responsive to the output of said first memory for generating said variable reference signal, fourth register means increasing in response to said comparator output and in response to said second counter means until said input signal and said reference signal are approximately equal.

8. The system recited in claim 7 further comprising a plurality of comparators and output register means, each comparator receiving independent input signals and said variable reference signal, each of said output register means providing an output when the respective input signal and the variable reference signal are approximately equal.

9. The system recited in claim 1 further comprising a plurality of comparators and output register means, each comparator receiving independent input signals and a common reference signal in response to the output from said first memory means, said output register means each providing an output signal when the input signals and reference signal are approximately equal.

10. The system recited in claim 1 wherein said input signal represents a voice signal and said system is a voice compander system.

* * * * *